United States Patent
Nagarajegowda et al.

(10) Patent No.: US 11,403,190 B2
(45) Date of Patent: Aug. 2, 2022

(54) DYNAMIC SNAPSHOT SCHEDULING FOR DATA STORAGE

(71) Applicant: EMC IP Holding Company LLC, Hopkinton, MA (US)

(72) Inventors: Deepak Nagarajegowda, Cary, NC (US); Parminder Singh Sethi, Punjab (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 102 days.

(21) Appl. No.: 17/062,937

(22) Filed: Oct. 5, 2020

(65) Prior Publication Data
US 2022/0107870 A1  Apr. 7, 2022

(51) Int. Cl.
*G06F 12/00* (2006.01)
*G06F 11/14* (2006.01)
*G06F 11/34* (2006.01)

(52) U.S. Cl.
CPC ...... *G06F 11/1469* (2013.01); *G06F 11/1451* (2013.01); *G06F 11/1461* (2013.01); *G06F 11/1464* (2013.01); *G06F 11/3409* (2013.01); *G06F 2201/84* (2013.01)

(58) Field of Classification Search
CPC ............ G06F 11/1461; G06F 11/1451; G06F 11/1464; G06F 11/1469; G06N 20/00; G06K 9/6276
See application file for complete search history.

(56) References Cited

U.S. PATENT DOCUMENTS

| | | | | |
|---|---|---|---|---|
| 8,566,285 | B2 * | 10/2013 | Altrichter | G06F 9/4856 718/103 |
| 10,089,144 | B1 * | 10/2018 | Nagpal | G06F 9/5027 |
| 10,248,618 | B1 * | 4/2019 | Gaurav | G06F 16/128 |
| 2016/0343080 | A1 * | 11/2016 | Weng | G06F 16/215 |

OTHER PUBLICATIONS

DELL Inc., "DELL EMC Unity: Snapshots and Thin Clones," Jan. 1, 2019, Published in the USA [Jan. 2019] [White Paper] [H15089.6], 31 pages.
mc-stan.org, "Stan," Retrieved from the Internet: Nov. 3, 2020, 2 pages.
github.com, "facebook / prophet," Retrieved from the Internet: Nov. 3, 2020, 6 pages.
facebook.github.io, "Forecasting at scale," Retrieved from the Internet: Nov. 3, 2020, 4 pages.

* cited by examiner

*Primary Examiner* — Gurtej Bansal
(74) *Attorney, Agent, or Firm* — Amin, Turocy & Watson, LLP

(57) ABSTRACT

Techniques are provided for dynamic snapshot scheduling. In an example, a dynamic snapshot scheduler can analyze historical data about storage system resources. The dynamic snapshot scheduler can use this historical data to predict how the storage system resources will be used in the future. Based on this prediction, the dynamic snapshot scheduler can schedule snapshot activities for one or more times that are relatively unlikely to experience system resource contention. The dynamic snapshot scheduler can then initiate snapshot activities at those scheduled times.

20 Claims, 13 Drawing Sheets

DYNAMIC SNAPSHOT SCHEDULING FOR DATA STORAGE

TECHNICAL FIELD

The present application relates generally to backing up computer data across multiple computing devices.

BACKGROUND

In storing computer data, such as with storage arrays (which can generally be a computer data storage system that comprises multiple hard disks or storage drives), data protection can be an important feature in that it can be utilized to protect data in the event of unforeseen issues that would otherwise lead to data loss or data unavailability.

One form of data protection can utilize snapshots (which can generally comprise a point-in-time copy of data that is stored on a storage system). Snapshots can be used to take data backups at certain intervals.

However, snapshot activity in a storage system can be a computing resources-expensive activity. That is, snapshot activity can utilize a relatively high about of processing resources and memory resources to create, copy and transfer snapshot data from one hard disk to another. Sometimes, snapshot activity can involve multiple hard disks, where the snapshot is sufficiently large.

Snapshot activity can act as a bottleneck on a storage system performance, which can lead to user issues and user dissatisfaction. For example, a response time to user request can increase, leading to greater wait times to fetch data if the snapshot activity is being performed at the same time as the request. Snapshot activity can lead to resource contention within a storage array.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
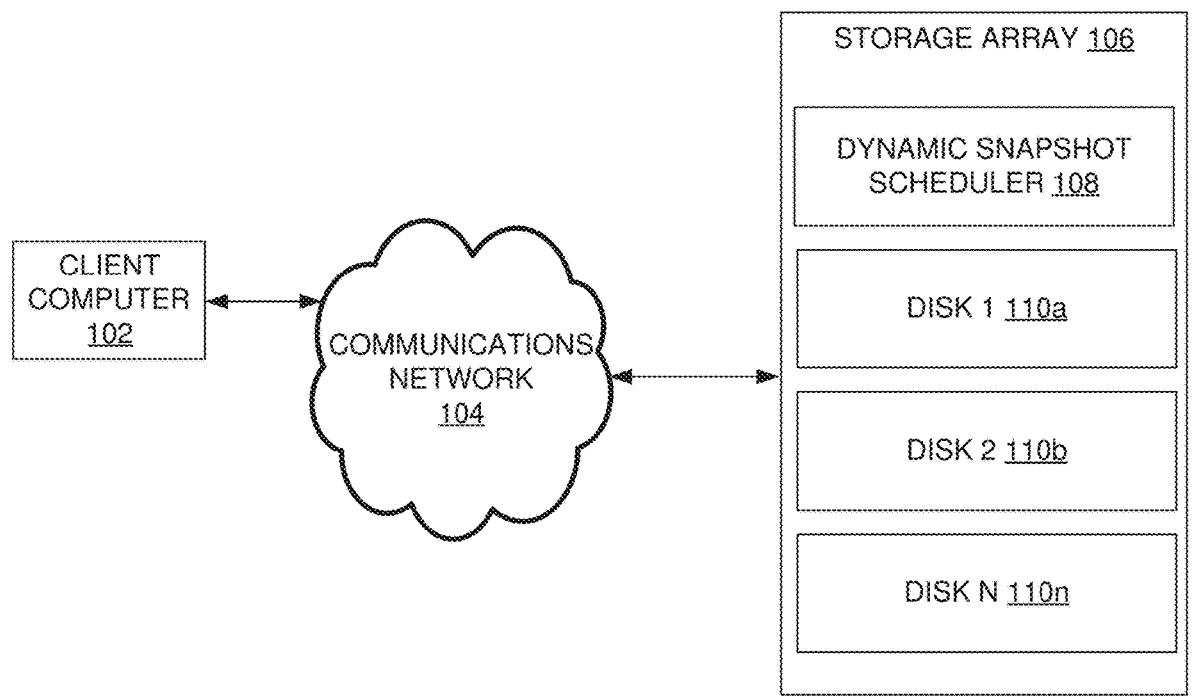
FIG. 1 illustrates an example system architecture that can facilitate dynamic snapshot scheduling for data storage, in accordance with certain embodiments of this disclosure.

Some techniques for taking snapshots involve scheduling taking a snapshot at a fixed time and for a fixed frequency. A problem with these techniques can be a lack of scheduling flexibility.

That is, these techniques that support only static scheduling (for a fixed time and a fixed frequency), which can lead to serious resource conflicts and contentions (of computing resources such as processing resources, memory resources, and communications network resources), leading to possible poor overall system performance during certain times of the day when snapshot activity is also occurring.

An approach according to the present techniques can mitigate this problem with snapshot techniques by predicting a time to take a snapshot where there will not be resource contention (or it will be reduced) as a result of snapshot activity. An approach according to these techniques can lead to higher system performance and higher user satisfaction.

An example approach according to the present techniques can implement the following aspects. First, historical data in a storage array can be mined for performance data (taken, e.g., every 5 minutes), system configuration data (taken, e.g., every hour), and snapshot data (e.g., a schedule, a frequency, a start time, an end time, and a total run time for one or more snapshots).

Then, anomalies in the data can be detected, where an anomaly can be a data point that falls outside of statistic thresholds for example upper and lower bounds within a given time period. Such anomalous data points can be removed from the data.

Then, dynamic time warping and customized time window approaches can be used to determine a preferred time slot that is predicted to have a relatively low probability of resource contention issues relating to taking a snapshot at this time.

Based on this prediction, in some examples, snapshots can be scheduled dynamically in a staggered manner.

That is, approaches according to the present techniques can be used to mitigate a performance bottleneck issue that would otherwise be caused by performing a snapshot task or a snapshot job.

An approach according to the present techniques can determine a time slot when a resource-critical snapshot job can be run on an enterprise device. In some examples, a snapshot job can be scheduled across different time chunks throughout one or more days, where performing the entire job at once could lead to resource contention. Approaches according to the present techniques can be implemented to understand resource conflicts and resource requirements throughout a day by analyzing resource consumption patterns at different times during a day.

In some examples, it can be determined to what degree computing resource usage is as a result of taking a snapshot. In some examples, there can be multiple storage processors, multiple storage ports, and multiple hosts (virtual machines). In some examples, a snapshot workflow can travel through a specific path comprising a particular processor, a particular set of ports, and a particular set of hosts.

Performance and metrics data can be viewed at a port level and at a host level. By analyzing computing resource usage at this level, it can be determined to what degree resource consumption is driven by snapshot activity, and to what degree resource consumption is driven by other storage tasks.

There can be other approaches to determining whether peak resource usage is caused by snapshot activity. In some storage arrays, snapshot activity can take a known percentage of computing resources to perform snapshots. In some examples, snapshot activity itself usually does not drive peak resource utilization. Snapshot resource utilization as a percentage of overall storage resource utilization can be an established benchmark. Using this benchmark data, it can be subtracted from overall resource utilization data to determine what resource utilization is caused by non-snapshot activity.

Some prior techniques support only static scheduling (i.e., at a fixed time and at a fixed frequency), which can lead to resource (e.g., processing, memory, and network) conflicts and contentions, which can cause poor overall system performance during a time at which snapshot activities are being performed.

The present techniques can be implemented to mitigate against a performance bottleneck issue that can be caused by performing snapshot activities. The present techniques can be implemented to determine a time slot (or time chunk) for snapshot activities to be performed. Additionally, the present techniques can be implemented to schedule snapshot activities during different, non-contiguous, time chunks throughout a day (or other time period), as opposed to performing snapshot activities in a single stretch. The present techniques can be implemented to understand various resource conflicts and requirements during a day by analyzing different resource consumption patterns over time.

Example Architectures

FIG. 1 illustrates an example system architecture 100 that can facilitate dynamic snapshot scheduling for data storage, in accordance with certain embodiments of this disclosure. As depicted, system architecture 100 comprises client computer 102, communications network 104, and storage array 106. In turn, storage array 106 comprises dynamic snapshot scheduler 108, disk 1 110a, disk 2 110b, and disk N 110N (which can indicate that storage array 106 can comprise an arbitrary number of storage disks or other computer storage devices in various examples).

Figure 13:
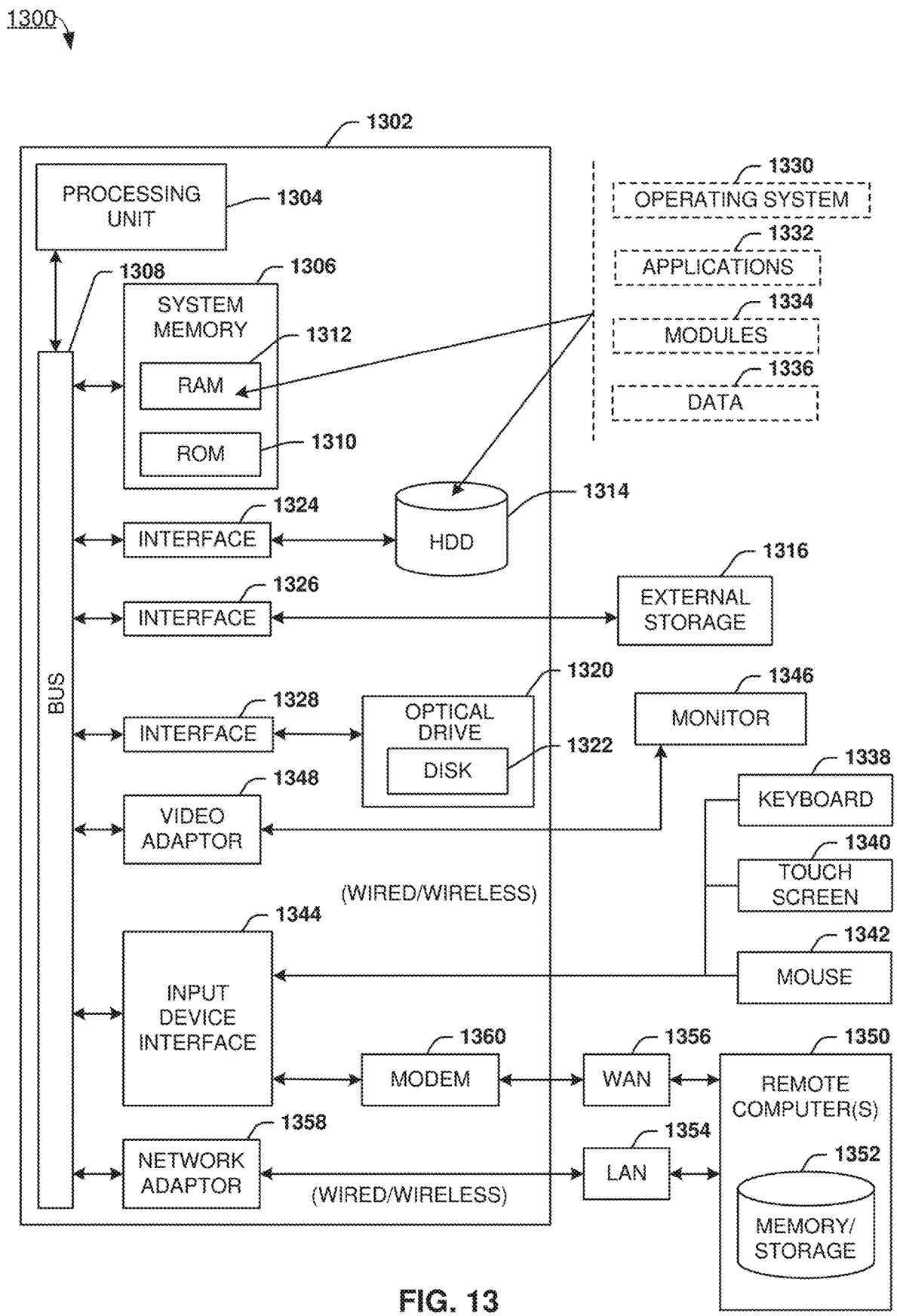
FIG. 13 illustrates an example block diagram of a computer operable to execute certain embodiments of this disclosure.

Each of client computer 102 and storage array 106 can be implemented with aspects of one or more instances of computer 1302 of FIG. 13. Communications network 104 can comprise a computer communications network, such as the INTERNET, or an isolated private computer communications network. Each of disk 1 110a, disk 2 110b, and disk N 110N can comprise one or more instances of hard disk drive 1314 of FIG. 13 (or another form of computer data storage) that can be joined together as part of a storage array.

Client computer can send requests to make storage operations on storage array 106. In an example, client computer 102 can send a message to storage array 106 via communications network 104, such as according to an object storage protocol, or a file system protocol such as a network file storage (NFS) protocol, or a server message block (SMB) protocol. Storage array 106 can process these requests by performing a corresponding operation (e.g., a file read or a file write).

Dynamic snapshot scheduler 108 can comprise a computer component (for example, machine-readable instructions that are stored in hard disk drive 1314 of FIG. 13 and executed by processing unit 1304). Dynamic snapshot scheduler 108 can schedule when to take a snapshot, and also take a scheduled snapshot, of data stored on disk 1 110a, disk 2 110b, and disk N 110N. In some examples, dynamic snapshot scheduler 108 can facilitate dynamic snapshot scheduling for data storage by implementing aspects of the process flows of FIG. 10, FIG. 11, and/or FIG. 12.

Figure 2:
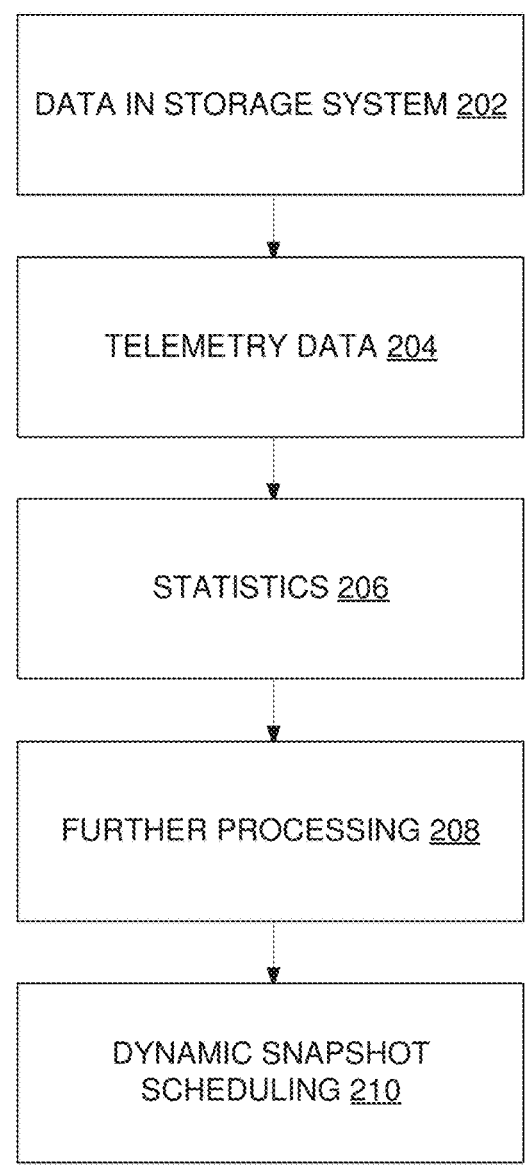
FIG. 2 illustrates another example system architecture that can facilitate dynamic snapshot scheduling for data storage, in accordance with certain embodiments of this disclosure.

FIG. 2 illustrates another example system architecture 200 that can facilitate dynamic snapshot scheduling for data storage, in accordance with certain embodiments of this disclosure. In some examples, system architecture 200 can represent a system architecture utilized by dynamic snapshot scheduler 108 of FIG. 1 to facilitate dynamic snapshot scheduling for data storage. As depicted, system architecture comprises data in storage system 202, telemetry data 204, statistics 206, further processing 208, and dynamic snapshot scheduling 210.

At data in storage system 202, dynamic snapshot scheduler 108 can gather data about data stored on disk 1 110a, disk 2 110b, and disk N 110N. From this information, dynamic snapshot scheduler 108 can determine telemetry data 204. This telemetry data can comprise information about system bandwidth usage over time (e.g., measured in megabytes per second (MBps)), system block latency over time (e.g., measured in milliseconds (ms)), system processor utilization over time (e.g., expressed in a percentage of total processing capability for each processor of a system), system input/output size (e.g., measured in kilobytes (KB)), system input/output (IO) per second (IOPS) (e.g., measured in IOPS), and system queue length (e.g., measured in IO).

In some examples, dynamic snapshot scheduler 108 can use this telemetry data to determine statistics 206. Examples of statistics can be a mean, a median, and a standard deviation of aspects of the telemetry data; a distribution of the telemetry data; data trends and data seasonality of the telemetry data (e.g., understanding how aspects of the telemetry data varies over different time dimensions, such as a minute, an hour, a day of the week, a week of the year, a month of the year, a holiday as opposed to a non-holiday, and a weekday as opposed to a weekend).

In some examples, dynamic snapshot scheduler 108 can perform further processing 208 on these statistics 206. Examples of this further processing can include using the statistics to predict values for the telemetry data in the future, such as in a next 24-hour period.

In some examples, dynamic snapshot scheduler 108 can take a result of the further processing to perform dynamic snapshot scheduling 210. In some examples, this can comprise determining a future time at which to perform a snapshot based on a result of the further processing. Where dynamic snapshot scheduler 108 determines a future time to perform a snapshot, then dynamic snapshot scheduler 108 can perform a snapshot when that future time occurs.

Example User Interface

Figure 3:
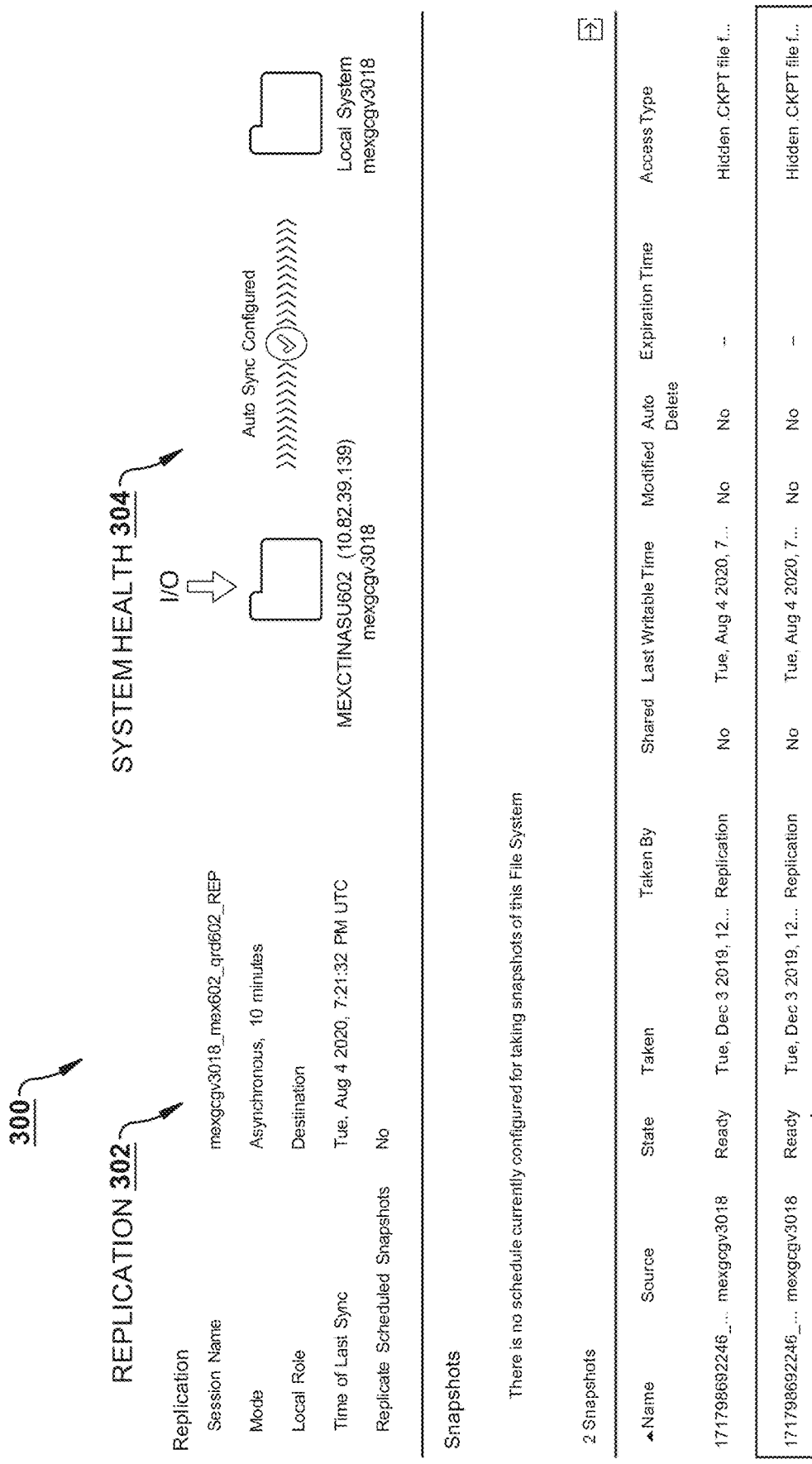
FIG. 3 illustrates an example snapshot policy user interface that can facilitate dynamic snapshot scheduling for data storage, in accordance with certain embodiments of this disclosure.

FIG. 3 illustrates an example snapshot policy user interface 300 that can facilitate dynamic snapshot scheduling for data storage, in accordance with certain embodiments of this disclosure. As depicted, example snapshot policy user interface 300 comprises replication 302, system health 304, and snapshots 306. In some examples, dynamic snapshot scheduler 108 of FIG. 1 can generate and/or utilize information of snapshot policy user interface 300 while facilitating dynamic snapshot scheduling for data storage.

Replication 302 can provide information such as a name for a replication session, a mode for the replication session (e.g., asynchronous or synchronous, and a corresponding time period), a local role for the replication session (e.g., source or destination), and a time of last synchronization for the replication session, and whether to replicate scheduled snapshots.

System health 304 can include information that includes a source and a destination for a replication, and whether auto synchronization between the source and the destination are properly configured.

Snapshots 306 can include information about whether there is a schedule currently configured for taking snapshots of a file system of storage array 106, and information about prior snapshots. This information about prior snapshots can include a name of a prior snapshot, a source of the prior snapshot, a state of the prior snapshot, a time at which the prior snapshot was taken, an indication of how the prior snapshot was taken (e.g., replication), an indication of whether the prior snapshot is shared, a last writeable time of the prior snapshot, an indication of whether the prior snapshot has been modified, an indication of whether the prior snapshot will be automatically deleted, an expiration time of the prior snapshot (where the prior snapshot will be automatically deleted), and an access time of the prior snapshot.

This information of example snapshot policy user interface 300 can be utilized by dynamic snapshot scheduler 108 to understand a current snapshot schedule—e.g., its frequency, its start time(s), its end time(s), snapshot usage, deletion policy, etc.

Example Graphs

Figure 4:
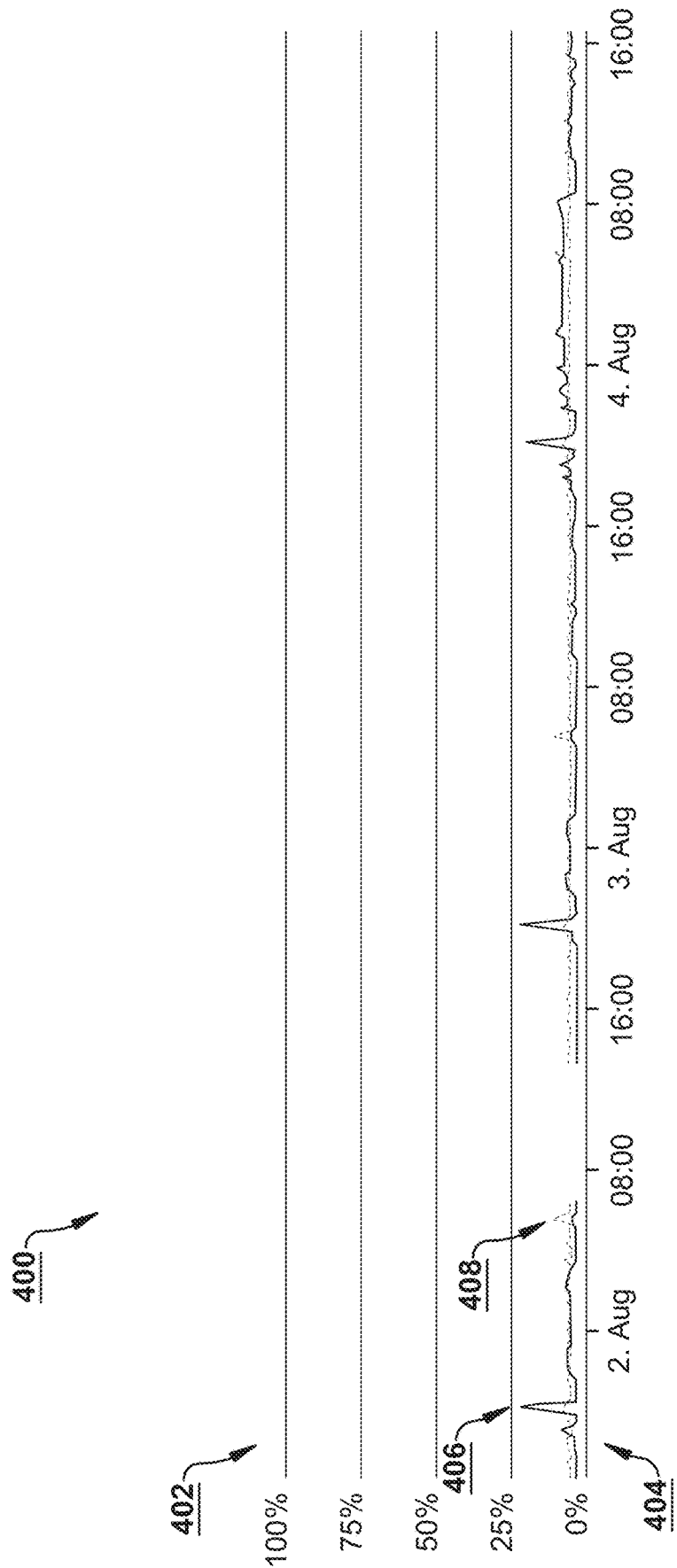
FIG. 4 illustrates an example graph that compares a snapshot schedule with resource utilization where snapshot activity is not found in system resource conflicts, and that can facilitate dynamic snapshot scheduling for data storage, in accordance with certain embodiments of this disclosure.

FIG. 4 illustrates an example graph 400 that compares a snapshot schedule with resource utilization where snapshot activity is not found in system resource conflicts, and that can facilitate dynamic snapshot scheduling for data storage, in accordance with certain embodiments of this disclosure. As depicted, graph 400 comprises y-axis 402, x-axis 404, snapshot schedule 406, and processor resource utilization 408.

Y-axis 402 measures an amount of processor utilization (such as one or more processors of storage array 106 of FIG. 1), expressed as a percentage of total capacity. X-axis 404 measures a time at which processing resources were utilized, expressed as a given time of a given day.

Snapshot schedule 406 plots an amount of processing resources utilized by snapshot activities at a given time. Processor resource utilization 408 plots an amount of system processing resources (independent of snapshot processing resources) utilized by non-snapshot activities at a given time.

In some examples, system resources used for snapshot activities and system resources used for other activities can be distinguished from each other. In some examples, a system can comprise two or more processors, multiple storage ports (i.e., network ports used for storage activities), and multiple hosts (or virtual machines). In some examples, a workflow of snapshot activities can travel through a specific path that comprises a particular processor, a given set of storage ports, and a given set of hosts or virtual machines.

Performance data and other metrics can be observed at a port and at a host (sometimes referred to as at a port level and at a host level). By monitoring performance data at this level, resource consumption by snapshot activities can be attributed to snapshot activities (and other resource consumption can then be attributed to non-snapshot activities).

By classifying system resource consumption by whether it is used for snapshot activities, it can then be determined whether snapshot activities contribute to times of peak resource consumption.

In other examples, it can be that, in a storage array, snapshot activities take a certain percentage of system resources to perform. Then, snapshot resource utilization as a percentage of overall system resource utilization can be established as a benchmark. Using this benchmark data, it can be determined whether current resource utilization is predominantly caused by snapshot activity.

In some examples, dynamic snapshot scheduler 108 of FIG. 1 can use the information of graph 400 to facilitate dynamic snapshot scheduling for data storage. For example, dynamic snapshot scheduler 108 can utilize the information of graph 400 to determine whether snapshot activities are high at times that there are system resource conflicts. Where snapshot activities are not high at times that there are system resource conflicts, such as is the case depicted in graph 400, then dynamic snapshot scheduler 108 can determine not to change a schedule for snapshots.

Figure 5:
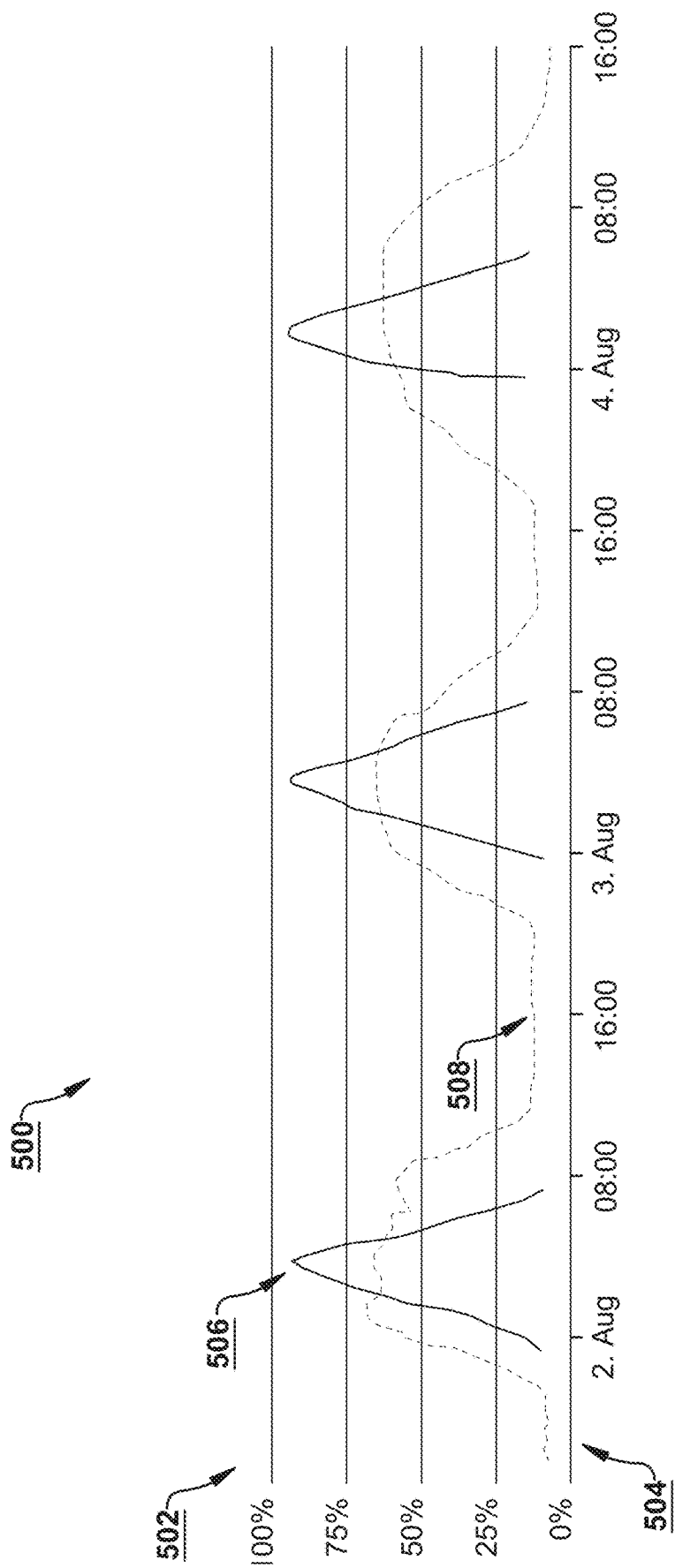
FIG. 5 illustrates an example graph that compares a snapshot schedule with resource utilization where snapshot activity is found in system resource conflicts, and that can facilitate dynamic snapshot scheduling for data storage, in accordance with certain embodiments of this disclosure.

FIG. 5 illustrates an example graph 500 that compares a snapshot schedule with resource utilization where snapshot activity is found in system resource conflicts, and that can facilitate dynamic snapshot scheduling for data storage, in accordance with certain embodiments of this disclosure. As depicted, graph 500 comprises y-axis 502, x-axis 504, snapshot schedule 506, and processor resource utilization 508.

Y-axis 502 (which can be similar to y-axis 402 of FIG. 4) measures an amount of processor utilization (such as one or more processors of storage array 106 of FIG. 1), expressed as a percentage of total capacity. X-axis 504 (which can be similar to x-axis 404 of FIG. 4) measures a time at which processing resources were utilized, expressed as a given time of a given day.

Snapshot schedule 506 (which can be similar to snapshot schedule 406 of FIG. 4) plots an amount of processing resources utilized by snapshot activities at a given time. Processor resource utilization 508 (which can be similar to processor resource utilization 408 of FIG. 4) plots an amount of system processing resources (independent of snapshot processing resources) utilized by non-snapshot activities at a given time.

In some examples, dynamic snapshot scheduler 108 of FIG. 1 can use the information of graph 500 to facilitate dynamic snapshot scheduling for data storage. For example, dynamic snapshot scheduler 108 can utilize the information of graph 500 to determine whether snapshot activities are high at times that there are system resource conflicts. Where snapshot activities are not high at times that there are system resource conflicts, such as is the case depicted in graph 500, then dynamic snapshot scheduler 108 can determine to change a schedule for snapshots.

Figure 6:
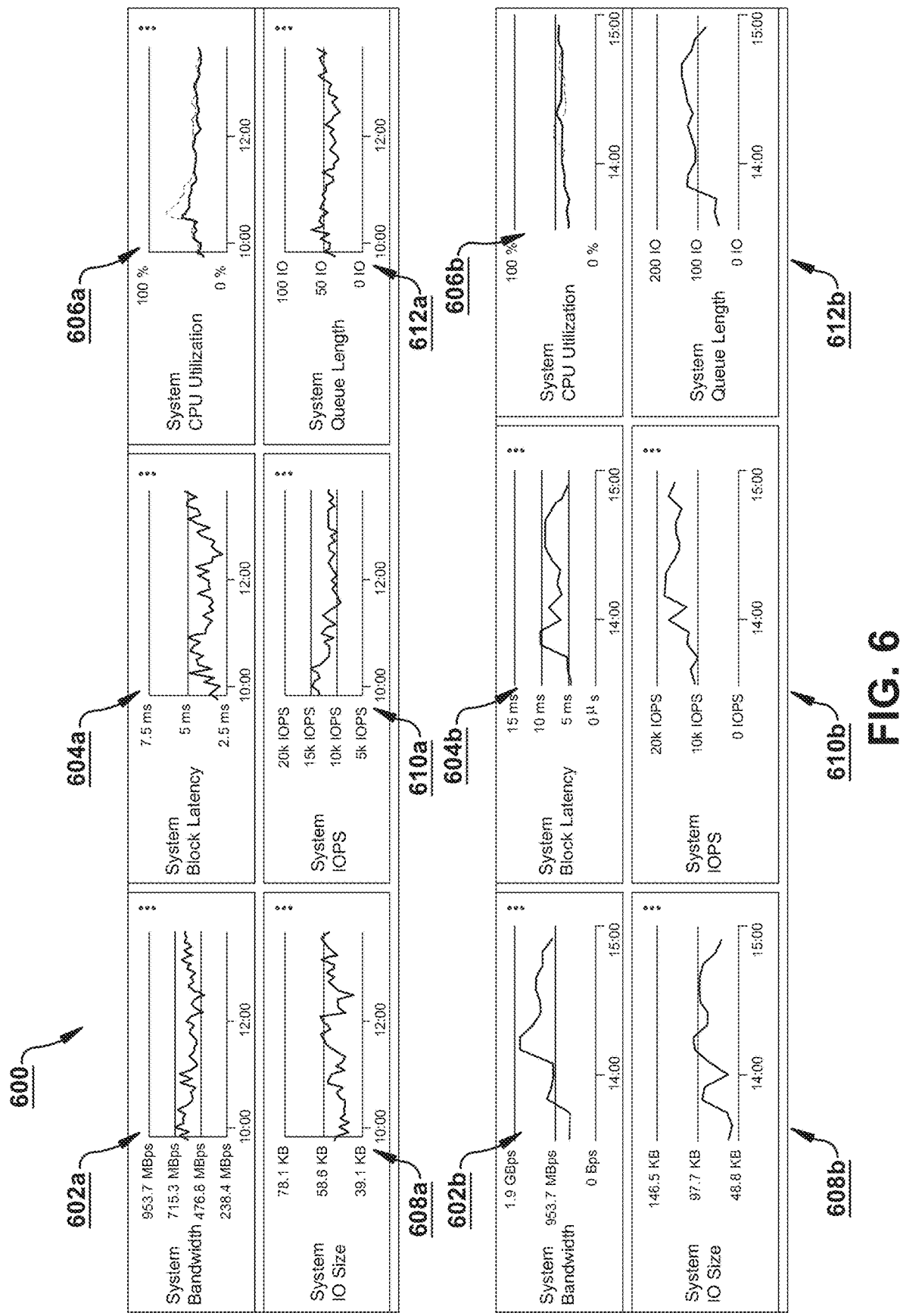
FIG. 6 illustrates example graphs used for predicting future system resource utilization based on historical system resource utilization, and that can facilitate dynamic snapshot scheduling for data storage, in accordance with certain embodiments of this disclosure.

FIG. 6 illustrates example graphs 600 used for predicting future system resource utilization based on historical system resource utilization, and that can facilitate dynamic snapshot scheduling for data storage, in accordance with certain embodiments of this disclosure. Graphs 600 comprises graph 602a, graph 604a, graph 606a, graph 608a, graph 610a, graph 612a, graph 602b, graph 604b, graph 606b, graph 608b, graph 610b, and graph 612b.

Each of graph 602a, graph 604a, graph 606a, graph 608a, graph 610a, and graph 612a measure historical data for a particular system metric. Then, each of graph 602b, graph 604b, graph 606b, graph 608b, graph 610b, and graph 612b predict how that metric will behave in the future, such as over a next 24-hour period.

Graph 602a and graph 602b each plot system block latency over time, with graph 602a representing historical data, and graph 602b representing predicted future data. Graph 604a and graph 604b each plot system bandwidth over time, with graph 604a representing historical data, and graph 604b representing predicted future data. Graph 606a and graph 606b each plot system processor utilization over time, with graph 606a representing historical data, and graph 606b representing predicted future data. Graph 608a and graph 608b each plot system IO size over time, with graph 608a representing historical data, and graph 608b representing predicted future data. Graph 610a and graph 610b each plot system IOPS over time, with graph 610a representing historical data, and graph 610b representing predicted future data. Graph 612a and graph 612b each plot system queue length over time, with graph 612a representing historical data, and graph 612b representing predicted future data.

In some examples, dynamic snapshot scheduler 108 of FIG. 1 can use the information of graphs 600 to facilitate dynamic snapshot scheduling for data storage. Dynamic snapshot scheduler 108 can take the historical data of graph 602a, graph 604a, graph 606a, graph 608a, graph 610a, and graph 612a as input, and use them to predict future system metrics as expressed in graph 602b, graph 604b, graph 606b, graph 608b, graph 610b, and graph 612b. From, these predicted future system metrics, dynamic snapshot scheduler 108 can then determine at future time at which to schedule snapshot activities.

Example Transformations

Figure 7:
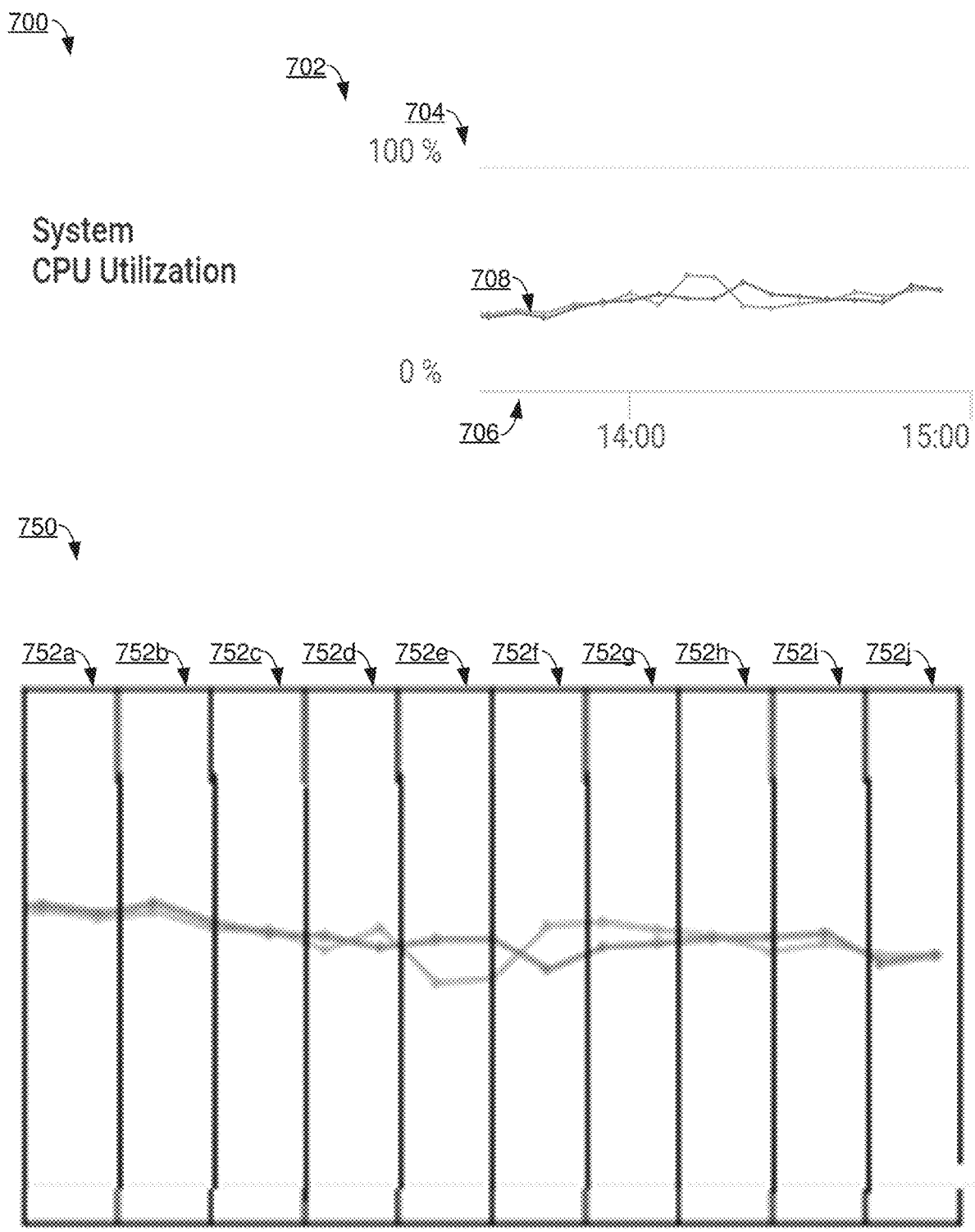
FIG. 7 illustrates an example transformation where system resource utilization data is divided into time chunks, and that can facilitate dynamic snapshot scheduling for data storage, in accordance with certain embodiments of this disclosure.

FIG. 7 illustrates an example transformation 700 where system resource utilization data is divided into time chunks, and that can facilitate dynamic snapshot scheduling for data storage, in accordance with certain embodiments of this disclosure. As depicted, transformation 700 comprises graph 702, and time chunks 750. In turn, graph 702 comprises y-axis 704 (which measures utilized processing resources as a percentage of total processing resources), x-axis 706 (which measures time), and processor resource utilization 708. Graph 702 plots processor resource utilization over time for a system, such as storage array 106 of FIG. 1.

Graph 702 can comprise one of graph 602b, graph 604b, graph 606b, graph 608b, graph 610b, and graph 612b of FIG. 6, which can indicate a prediction of how certain system metrics will behave in the future.

Time chunks 750 are a transformation of graph 702, where graph 702 has been divided into a plurality of time chunks. As depicted, graph 702 has now been divided into 10 time chunks—time chunk 752a, time chunk 752b, time chunk 752c, time chunk 752d, time chunk 752e, time chunk 752f, time chunk 752g, time chunk 752h, time chunk 752i, and time chunk 752j.

While the example of FIG. 7 comprises one system metric—processing resources—it can be appreciated that this is done for the sake of simplicity, and there can be examples that use different metrics, or more metrics than are in the example of FIG. 7.

In some examples, dynamic snapshot scheduler 108 of FIG. 1 can divide graph 702 into a finite number of time chunks 750. Dynamic snapshot scheduler 108 can determine a size of a time chunk (e.g., 2.4 hours) by tuning a hyperparameter for the time chunk size for a process, where the hyperparameter is part of a process implemented by dynamic snapshot scheduler 108, and refined experimentally.

Figure 8:
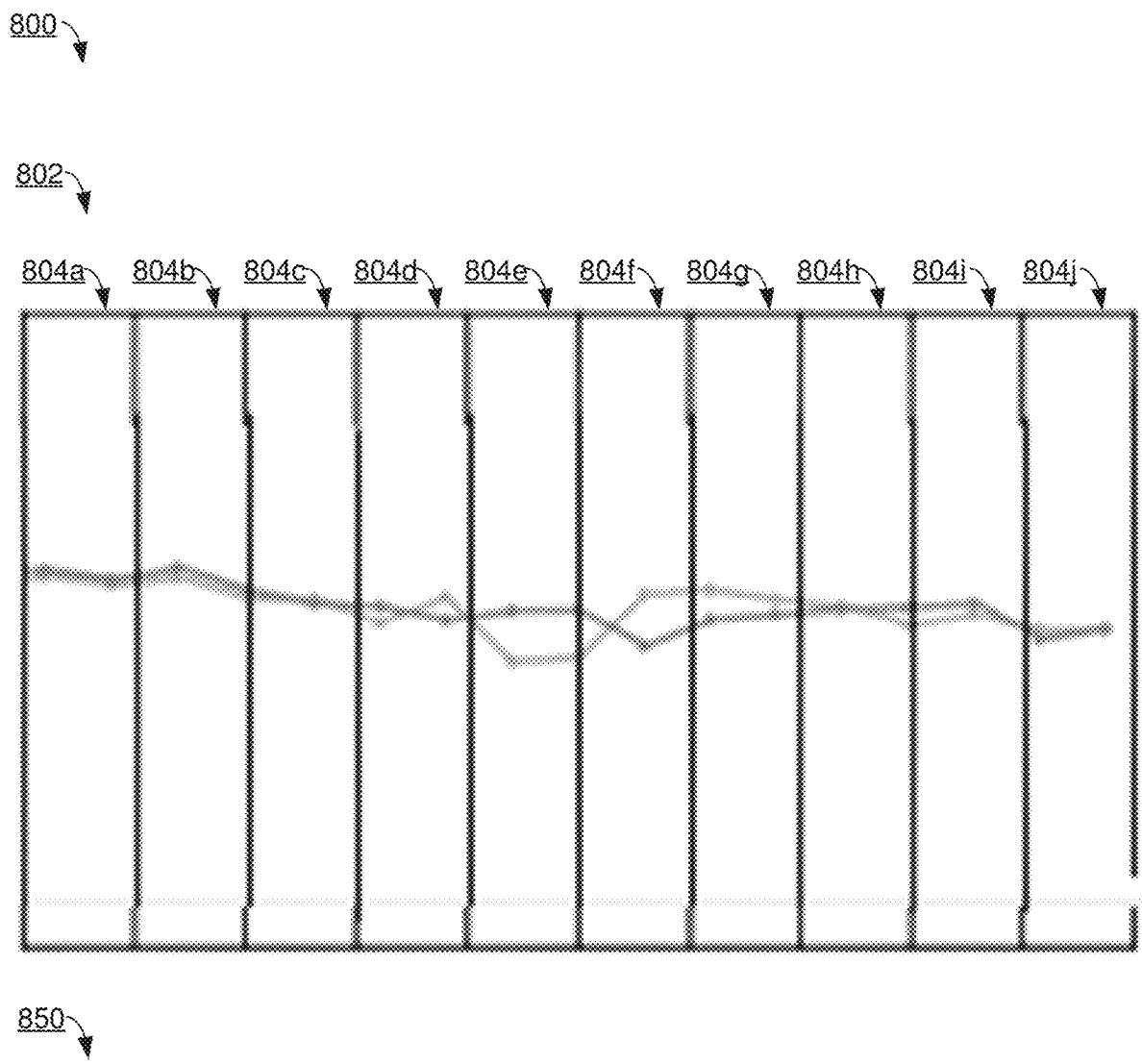
FIG. 8 illustrates an example transformation where statistics are determined for time chunks of system resource utilization, and that can facilitate dynamic snapshot scheduling for data storage, in accordance with certain embodiments of this disclosure.

FIG. 8 illustrates an example transformation 800 where statistics are determined for time chunks of system resource utilization, and that can facilitate dynamic snapshot scheduling for data storage, in accordance with certain embodiments of this disclosure. As depicted, transformation 800 comprises time chunks 802 and statistics 850.

In some examples, time chunks 802 can be similar to time chunks 750 of FIG. 7. Additionally, time chunk 804a, time chunk 804b, time chunk 804c, time chunk 804d, time chunk 804e, time chunk 804f, time chunk 804g, time chunk 804h, time chunk 804i, and time chunk 804j can be similar to time chunk 752a, time chunk 752b, time chunk 752c, time chunk 752d, time chunk 752e, time chunk 752f, time chunk 752g, time chunk 752h, time chunk 752i, and time chunk 752j, respectively.

The information of time chunks 802 can be further transformed into statistics 850 by dynamic snapshot scheduler 108 of FIG. 8 to facilitate dynamic snapshot scheduling for data storage. As depicted, dynamic snapshot scheduler 108 of FIG. 1 can determine one or more statistics for each of time chunk 804a, time chunk 804b, time chunk 804c, time chunk 804d, time chunk 804e, time chunk 804f, time chunk 804g, time chunk 804h, time chunk 804i, and time chunk 804j. These statistics in statistics 850 can include a mean and a standard deviation.

Dynamic snapshot scheduler 108 of FIG. 1 can further utilize statistics 850 to perform a dynamic time warping process to determine a similarity between the time chunks of time chunks 802. A dynamic time warping approach can be utilized to measure a similarity between two temporal sequences that may vary in speed. For example, similarities in two people walking can be determined using a dynamic time warping approach, even if one person is walking faster than the other, or if the people accelerated and decelerated during the course of observing them.

In some examples, a data storage system, such as storage array 106 of FIG. 1, can comprise multiple processors, and dynamic snapshot scheduler 108 can optimize for these multiple parameters. For other parameters, such as queue length, an approach that utilizes an upper and lower bound of an expected queue length over the next 24 hours with a 95% confidence interval can be utilized.

These statistics can be utilized to identify time chunks that contain similar time series data. In some examples, this could comprise identifying similar time chunks where time series could be trending down, trending up, or be flat.

Figure 9:
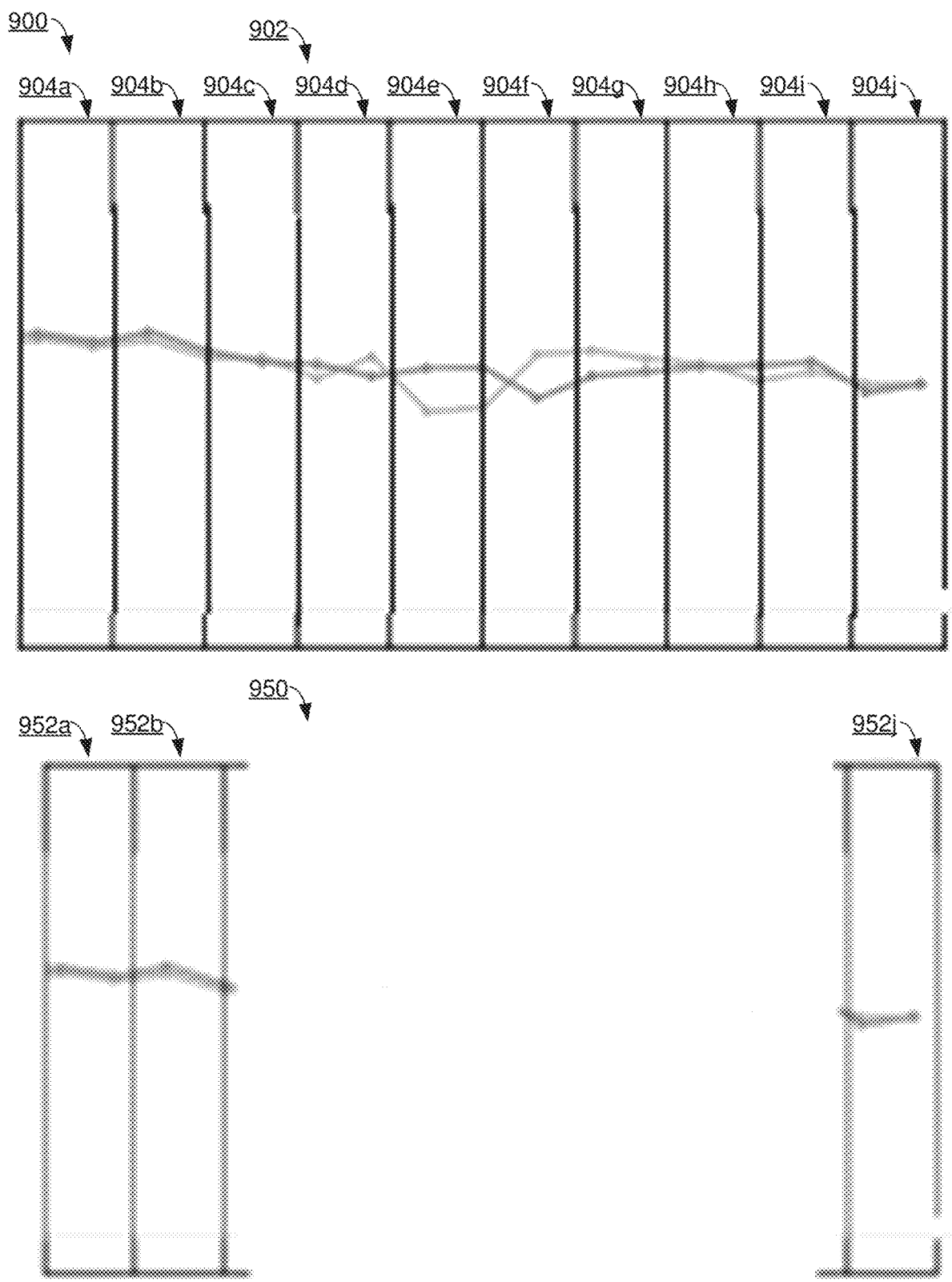
FIG. 9 illustrates an example transformation where similar time chunks are selected, and that can facilitate dynamic snapshot scheduling for data storage, in accordance with certain embodiments of this disclosure.

FIG. 9 illustrates an example transformation 900 where similar time chunks are selected, and that can facilitate dynamic snapshot scheduling for data storage, in accordance with certain embodiments of this disclosure. As depicted, transformation 900 comprises time chunks 902 and selected time chunks 950.

Time chunks 902 can be similar to time chunks 802 of FIG. 8. Additionally, time chunk 904a, time chunk 904b, time chunk 904c, time chunk 904d, time chunk 904e, time chunk 904f, time chunk 904g, time chunk 904h, time chunk 904i, and time chunk 904j can be similar to time chunk 852a, time chunk 852b, time chunk 852c, time chunk 852d, time chunk 852e, time chunk 852f, time chunk 852g, time chunk 852h, time chunk 852i, and time chunk 852j, respectively.

Time chunks 950 can comprise a subset of time chunks 902, where time chunks 950 can be times that are selected for snapshot activities to be performed in the future. As depicted, time chunks 950 comprises three time chunks—time chunk 952a (which is a selected version of time chunk 904a), time chunk 952b (which is a selected version of time chunk 904b), and time chunk 952j (which is a selected version of time chunk 904j). It can be appreciated that there can be examples where more or fewer time chunks are selected for conducting snapshot activities.

These three time chunks of time chunks 950 can be selected from time chunks 902 based on being similar to each other. Then, in an example, statistics (such as those described with respect to FIG. 8) of the mean, standard deviation, and similarity of time chunks can be analyzed to determine when to schedule snapshot activity. Time chunks can be selected for snapshot activity based on a combination of a lowest mean, a lowest standard deviation, and a highest similarity.

In an example, using those factors it could be determined that time chunk 952j will be used for snapshot activity. In some examples, time chunk 952j (which spans a time of 2.4 hours) can be subdivided into even more time chunks to find a time within time chunk 952j for snapshot activity.

An approximate time for one snapshot can be determined based on historical data of how long snapshots have taken to perform. In some examples, an approximate time for one snapshot can be determined to be longer than a chunk size (e.g., snapshots can take approximately 4.8 hours, where time chunk 952j spans 2.4 hours). Where this is the case, a second time chunk (e.g., time chunk 952a or time chunk 952b) can be selected using similar criteria as used to select time chunk 952j for snapshot activity. Then snapshot activity can be performed in these multiple time chunks.

Example Process Flows

Figure 10:
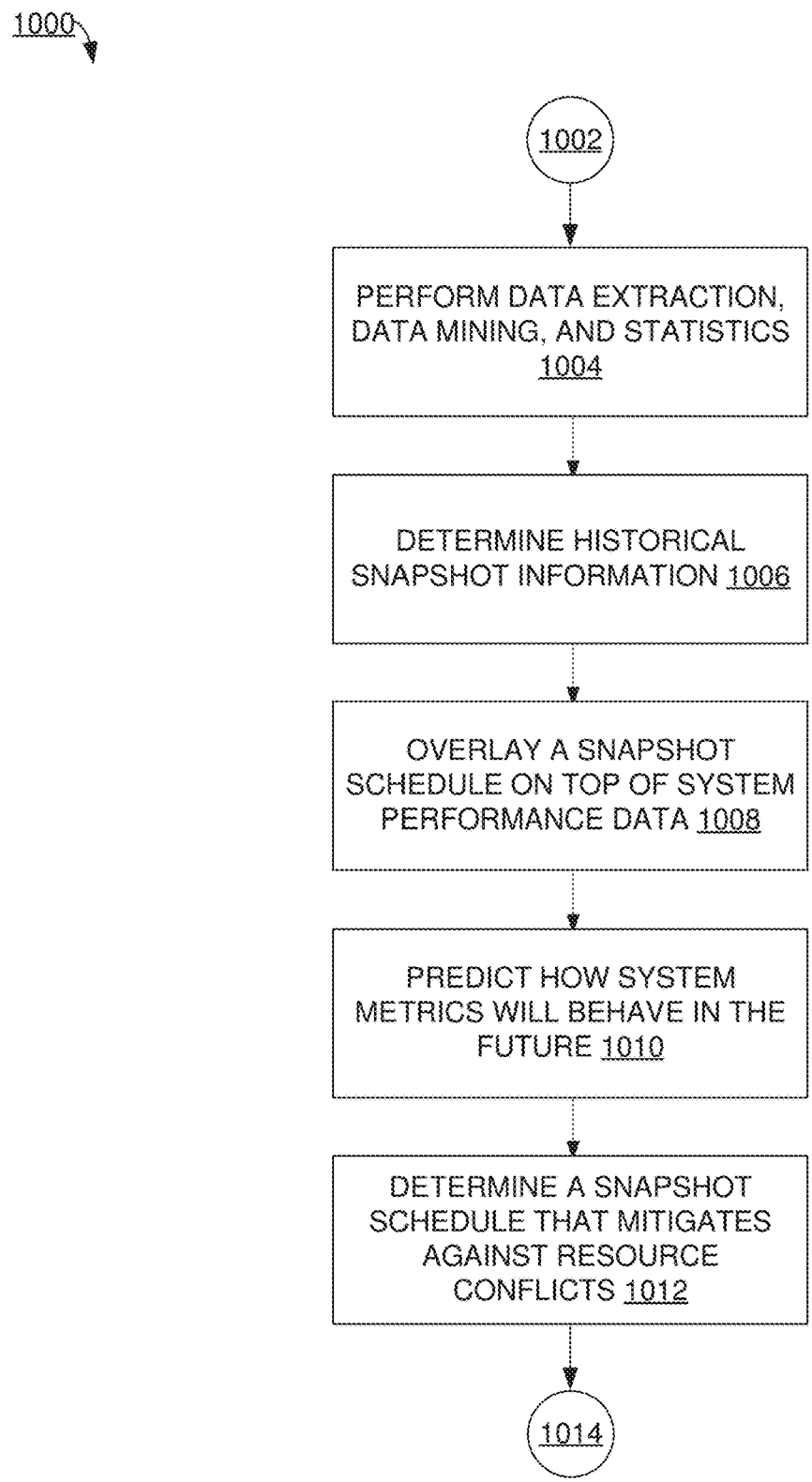
FIG. 10 illustrates an example process flow for dynamic snapshot scheduling for data storage, in accordance with certain embodiments of this disclosure.

FIG. 10 illustrates an example process flow 1000 for dynamic snapshot scheduling for data storage, in accordance with certain embodiments of this disclosure. In some examples, aspects of process flow 1000 can be implemented by storage array 106 of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with aspects of process flow 1100 of FIG. 11 and/or process flow 1200 of FIG. 12.

Process flow 1000 begins with 1002 and moves to operation 1004. Operation 1004 depicts performing data extraction, data mining, and statistics.

In data extraction, a system's past performance telemetry data can be determined for a given time period, such as the prior 365 days.

This extracted data can then be mined to determine statistics about the data. For example, a mean, median, and standard deviation can be determined for performance metrics of the system that are identified in the extracted data. A distribution of the data is another statistic that can be determined. How metrics of the system behave over various time dimensions can be determined. These time dimensions can include minutes, hours, a day of the week, a week of the year, a month of the year, a holiday as opposed to a non-holiday, and a weekday as opposed to a weekend.

After operation 1004, process flow 1000 moves to operation 1006.

Operation 1006 depicts determining historical snapshot information. In some examples, the historical snapshot information of operation 1006 can comprise aspects of data displayed in example snapshot policy user interface 300 of FIG. 3.

The historical snapshot information can comprise a historical snapshot schedule, and its details. This can include a frequency of the snapshot schedule, a start time of a snapshot schedule, an end time of the snapshot schedule, a snapshot usage of the snapshot schedule, and a deletion policy of the snapshot schedule.

After operation 1006, process flow 1000 moves to operation 1008.

Operation 1008 depicts overlaying a snapshot schedule on top of system performance data. An example of implementing operation 1008 can be seen in graph 400 of FIG. 4 and graph 500 of FIG. 5. As a result of overlaying a snapshot schedule on top of system performance data, it can be determined whether snapshot activity is involved in system resource conflicts (as in graph 500, which can lead to a determination to change a snapshot schedule), or that snapshot activity is not involved in system resource conflicts (as in graph 400, which can lead to a determination not to change a snapshot schedule).

After operation 1008, process flow 1000 moves to operation 1010.

Operation 1010 depicts predicting how system metrics will behave in the future. An example of implementing operation 1010 can be seen in graphs 600 of FIG. 6.

In an example of operation 1010, dynamic snapshot scheduler 108 of FIG. 1 can predict how each system metric will behave over the next 24 hours, using a prior 168 hours of data that can capture hourly, daily, weekday, and weekend variance. Dynamic snapshot scheduler 108 can use a machine learning regressor approach, with time series forecasting, to predict how each of the metrics will behave over the next 24 hours.

It some examples, operation 1010 can comprise forecasting time series data based on an additive model where non-linear trends can be fit with yearly, weekly, and daily seasonality, as well as holiday effects.

After operation 1010, process flow 1000 moves to operation 1012.

Operation 1012 depicts determining a snapshot schedule that mitigates against resource conflicts. In some examples, operation 1012 can be implemented with aspects of transformation 700 of FIG. 7, transformation 800 of FIG. 8, and/or transformation 900 of FIG. 9. In some examples, operation 1010 can be implemented with process flow 1100 of FIG. 11.

After operation 1012, process flow 1000 moves to operation 1014, where process flow 1000 ends.

Figure 11:
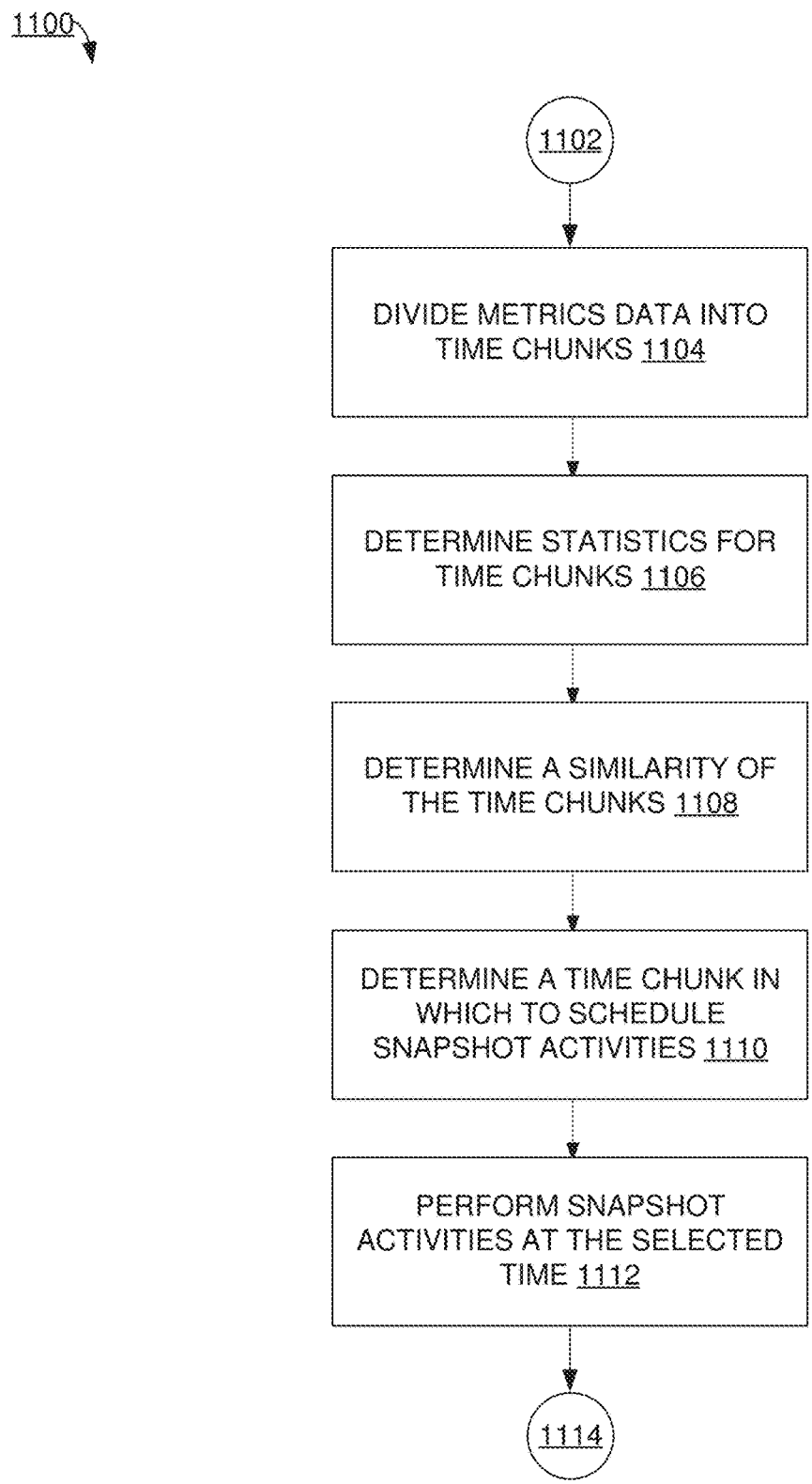
FIG. 11 illustrates another example process flow for dynamic snapshot scheduling for data storage, in accordance with certain embodiments of this disclosure.

FIG. 11 illustrates another example process flow 1100 for dynamic snapshot scheduling for data storage, in accordance with certain embodiments of this disclosure. In some examples, aspects of process flow 1100 can be implemented by storage array 106 of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with aspects of process flow 1000 of FIG. 10, and/or process flow 1200 of FIG. 12.

In an example, metrics of a system can be evaluated to find a schedule for snapshot activities. Such system metrics can include processor utilization, block latency, IOPS, etc. A prediction of how these metrics will behave in the future can be determined, such as in operation 1010 of FIG. 10. From there, a future schedule for snapshot activities can be determined using process flow 1100.

Process flow 1100 begins with 1102 and moves to operation 1104. Operation 1104 depicts dividing metrics data into time chunks. In some examples, aspects of implementing operation 1104 can be seen in transformation 700 of FIG. 7.

After operation 1104, process flow 1100 moves to operation 1106.

Operation 1106 depicts determining statistics for time chunks. In some examples, the time chunks can be the time chunks determined in operation 1104, and aspects of implementing operation 1106 can be seen in transformation 800 of FIG. 8.

After operation 1106, process flow 1100 moves to operation 1108.

Operation 1108 depicts determining a similarity of the time chunks. In some examples, a similarity of the time chunks can be determined using the statistics determined in operation 1106. In some examples, aspects of implementing operation 1108 can be seen in transformation 800 of FIG. 8.

After operation 1108, process flow 1100 moves to operation 1110.

Operation 1110 depicts determining a time chunk in which to schedule snapshot activities. In some examples, aspects of implementing operation 1110 can be seen in transformation 900 of FIG. 9.

After operation 1108, process flow 1100 moves to operation 1110.

Operation 1112 depicts performing snapshot activities at the selected time. In some examples, operation 1112 can comprise dynamic snapshot scheduler 108 of FIG. 1 performing a snapshot of data stored on disk 1 110*a*, disk 2 110*b*, and disk N 110N at the time determined in operation 1110.

After operation 1112, process flow 1100 moves to 1114, where process flow 1100 ends.

Figure 12:
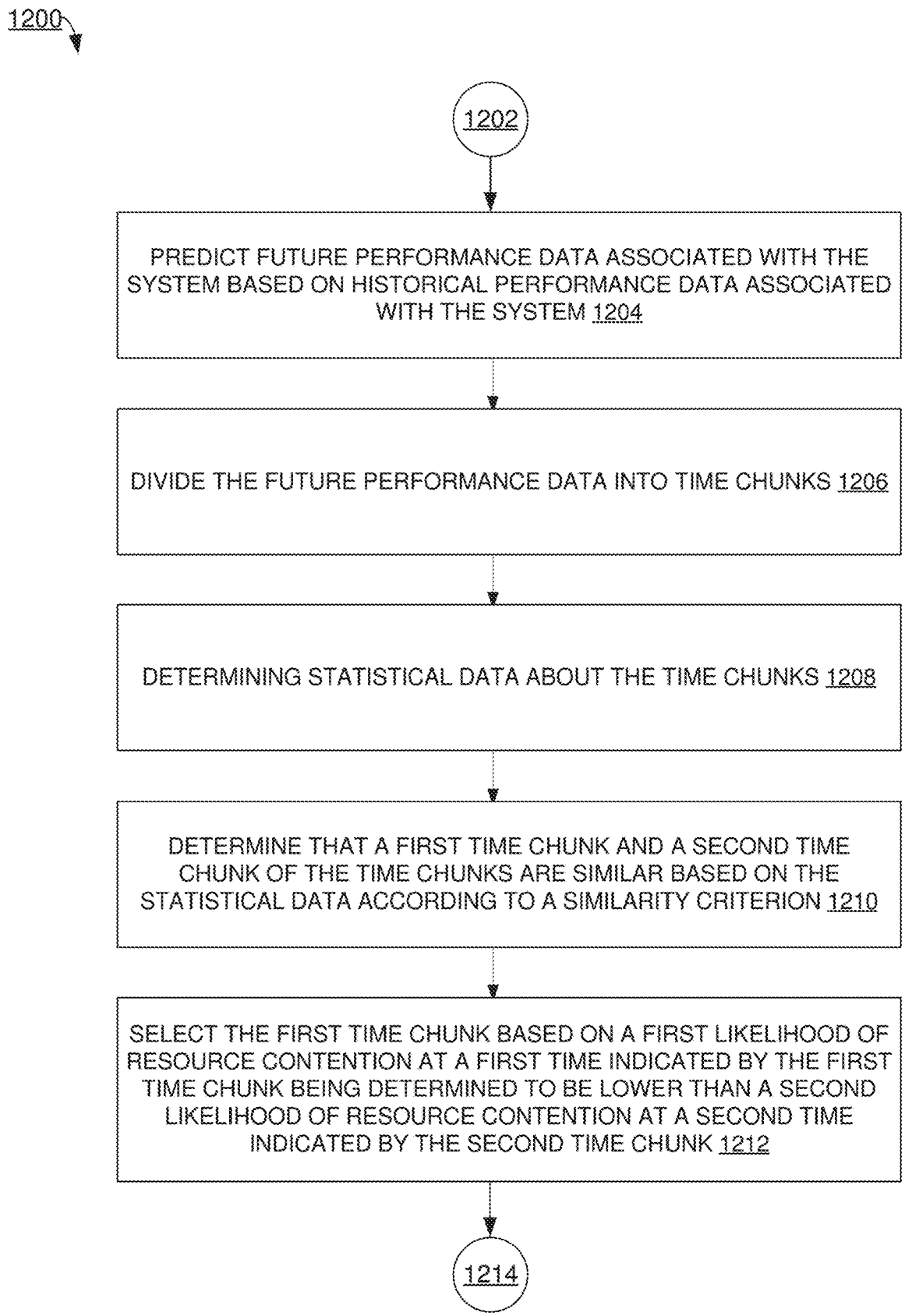
FIG. 12 illustrates another example process flow for dynamic snapshot scheduling for data storage, in accordance with certain embodiments of this disclosure.

FIG. 12 illustrates an example process flow 1200 for dynamic snapshot scheduling for data storage, in accordance with certain embodiments of this disclosure. In some examples, aspects of process flow 1200 can be implemented by storage array 106 of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with aspects of process flow 1000 of FIG. 10 and/or process flow 1100 of FIG. 11.

Process flow 1200 begins with 1202 and moves to operation 1204. Operation 1204 depicts predicting future performance data associated with the system based on historical performance data associated with the system.

After operation 1204, process flow 1200 moves to operation 1206.

Operation 1206 depicts dividing the future performance data into time chunks.

After operation 1206, process flow 1200 moves to operation 1208.

Operation 1208 depicts determining statistical data about the time chunks.

After operation 1208, process flow 1200 moves to operation 1210.

Operation 1210 depicts determining that a first time chunk and a second time chunk of the time chunks are similar based on the statistical data according to a similarity criterion.

After operation 1210, process flow 1200 moves to operation 1212.

Operation 1212 depicts selecting the first time chunk based on a first likelihood of resource contention at a first time indicated by the first time chunk being determined to be lower than a second likelihood of resource contention at a second time indicated by the second time chunk.

After operation 1212, process flow 1200 moves to operation 1214.

Operation 1214 depicts performing a snapshot operation to generate a snapshot of the system at the first time.

After operation 1214, process flow 1200 moves to 1216, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, aspects of computing environment 1300 can be used to implement aspects of client computer 102, or storage array 106 of FIG. 1. In some examples, computing environment 1300 can implement aspects of the process flows of FIGS. 10-12 to facilitate dynamic snapshot scheduling for data storage.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      predicting future performance data associated with the system based on historical performance data associated with the system;
      dividing the future performance data into time chunks;
      determining statistical data about the time chunks;
      determining that a first time chunk and a second time chunk of the time chunks are similar based on applying a dynamic time warping technique to the statistical data according to a similarity criterion;
      selecting the first time chunk based on a first likelihood of resource contention at a first time indicated by the first time chunk being determined to be lower than a second likelihood of resource contention at a second time indicated by the second time chunk; and
      performing a snapshot operation to generate a snapshot of the system at the first time.

2. The system of claim 1, wherein the historical performance data comprises data representative of processing resources consumed on non-snapshot operations other than the snapshot operation.

3. The system of claim 1, wherein the operations further comprise:

determining a first size of the first time chunk based on a result of adjusting a hyperparameter for the first time chunk through multiple iterations.

4. The system of claim 1, wherein the operations further comprise:
determining a first size of the first time chunk based on how much time a previous snapshot has taken to complete.

5. The system of claim 1, wherein each time chunk of the time chunks has a same size.

6. The system of claim 1, wherein the statistical data comprises at least one of mean data representative of a mean determined from the time chunks and standard deviation data representative of a standard deviation determined from the time chunks.

7. A method, comprising:
predicting, by a system comprising a processor, future performance data of the system based on historical performance data of the system;
dividing the future performance data into time chunks;
identifying a subset of the time chunks based on similarity values of the time chunks, the similarity values being determined based on applying a dynamic time warping technique to the future performance data;
selecting a first time chunk of the subset of time chunks based on a first likelihood of resource contention at a first time indicated by the first time chunk being lower than a second likelihood of resource contention at a second time indicated by a second time chunk of the subset of time chunks; and
generating a snapshot of the system at the first time.

8. The method of claim 7, wherein performing the selecting of the first time chunk is based on determining that the first time chunk has a smaller mean than the second time chunk.

9. The method of claim 7, wherein the selecting of the first time chunk is based on determining that the first time chunk has a smaller standard deviation than the second time chunk.

10. The method of claim 7, wherein the selecting of the first time chunk comprises:
selecting a third time chunk of the subset of time chunks.

11. The method of claim 10, wherein the generating of the snapshot comprises:
generating the snapshot at the first time and generating another snapshot at a third time.

12. The method of claim 7, further comprising:
removing anomalous data from the historical performance data before the predicting of the future performance data of the system based on the historical performance data of the system.

13. The method of claim 12, wherein the anomalous data comprises:
data that falls outside of a statistical threshold for an upper bound or a lower bound for less than a first threshold amount of time.

14. A non-transitory computer-readable medium comprising instructions that, in response to execution, cause a system comprising a processor to perform operations, comprising:
dividing predicted future performance data associated with a predicted future performance of the system into a group of time chunks;
identifying a subgroup of the group of time chunks based on similarity values of the group of time chunks, the similarity values being determined based on applying dynamic time warping to the predicted future performance data;
selecting a first time chunk of the subgroup of group of time chunks based on a first likelihood of resource contention at a first time indicated by the first time chunk being lower than a second likelihood of resource contention at a second time indicated by a second time chunk of the subgroup of group of time chunks; and
performing a snapshot of the system at the first time.

15. The non-transitory computer-readable medium of claim 14, wherein the selecting of the first time chunk is based on determining that the first time chunk has a higher similarity value than the second time chunk.

16. The non-transitory computer-readable medium of claim 14, wherein the operations further comprise:
determining the predicted future performance data of the system based on previous performance data associated with a previous performance of the system.

17. The non-transitory computer-readable medium of claim 14, wherein the operations further comprise:
determining the predicted future performance data of the system based on previous configuration data previously applied to the system.

18. The non-transitory computer-readable medium of claim 14, wherein the operations further comprise:
determining the predicted future performance data of the system based on previous snapshot data representative of a previous snapshot of the system.

19. The non-transitory computer-readable medium of claim 18, wherein the previous snapshot data comprises at least one of:
schedule data representative of a schedule for snapshot activity, frequency data representative of a frequency of snapshot activity, first time data representative of a start time of snapshot activity, second time data representative of an end time of snapshot activity, and third time data representative of a total run time of snapshot activity.

20. The non-transitory computer-readable medium of claim 14, wherein the statistical data comprises at least one of mean data representative of a mean determined from the time chunks and standard deviation data representative of a standard deviation determined from the time chunks.

* * * * *